(12) United States Patent
Cai et al.

(10) Patent No.: US 12,465,732 B2
(45) Date of Patent: Nov. 11, 2025

(54) PRESSURE CONTROL VALVE FOR BLOOD SYSTEM AND ITS PRESSURE REGULATION METHOD

(71) Applicants: Yanshan University, Qinhuangdao (CN); Beijing University of Chinese Medicine Dongfang Hospital Qinhuangdao Hospital, Qinhuangdao (CN)

(72) Inventors: Wei Cai, Qinhuangdao (CN); Yunpeng Zhang, Qinhuangdao (CN); Mengtian Liu, Qinhuangdao (CN); Yuxi Zhao, Qinhuangdao (CN); Zhuofang Li, Qinhuangdao (CN); Luxuan Sun, Qinhuangdao (CN)

(73) Assignees: Yanshan University, Qinhuangdao (CN); Beijing University of Chinese Medicine Dongfang Hospital Qinhuangdao Hospital, Qinhuangdao (CN)

( * ) Notice: Subject to any disclaimer, the term of this patent is extended or adjusted under 35 U.S.C. 154(b) by 0 days.

(21) Appl. No.: 18/953,051

(22) Filed: Nov. 19, 2024

(65) Prior Publication Data
US 2025/0073433 A1    Mar. 6, 2025

(30) Foreign Application Priority Data
Dec. 21, 2023  (CN) .......................... 202311772487.0

(51) Int. Cl.
*A61M 27/00*  (2006.01)
*A61M 39/22*  (2006.01)

(52) U.S. Cl.
CPC ............ *A61M 27/00* (2013.01); *A61M 39/22* (2013.01); *A61M 2039/226* (2013.01);
(Continued)

(58) Field of Classification Search
CPC .......... A61M 27/002; A61M 2027/004; A61M 27/006; A61M 27/008; A61M 1/3653;
(Continued)

(56) References Cited

U.S. PATENT DOCUMENTS 3,765,032 A * 10/1973 Palma ............... A61M 39/0247
 623/1.24
3,998,222 A * 12/1976 Shihata ............... A61M 1/3655
 604/9

(Continued)

FOREIGN PATENT DOCUMENTS

AU    2003252399 A1    3/2004
CN    201179271 Y     1/2009
(Continued)

OTHER PUBLICATIONS

Gutierrez, G., Reines, H., & Wulf-Gutierrez, M. E. (2004). Clinical review: hemorrhagic shock. Critical care, 8, 1-9. (Year: 2004).*
(Continued)

*Primary Examiner* — Adam Marcetich (57) ABSTRACT

A pressure control valve includes a valve body with a hollow column structure, a valve cover, a valve core, a sealing device and a driving device. A side wall of the valve body is connected with a lower surface of the valve cover, and is provided with a through hole. The valve core, the sealing device and the driving device are arranged at a connection between the valve cover and the valve body. A threaded groove is provided at each end of the through hole on the side wall of the valve body. An upper surface of the valve cover is provided with a threaded hole for a bolt to pass through to be connected to the threaded groove, and a space for mounting the driving device. A cover plate is provided above the space with two sides respectively connected to the valve cover through a cylindrical pin.

4 Claims, 6 Drawing Sheets

(52) U.S. Cl.
CPC .............. *A61M 2202/0413* (2013.01); *A61M 2205/103* (2013.01); *A61M 2205/3344* (2013.01)

(58) Field of Classification Search
CPC .............. A61M 1/3655; A61M 1/3656; A61M 1/3658; A61M 1/3659; A61M 1/3661; A61M 27/00; A61M 39/22; A61M 2039/226; A61M 2202/0413; A61M 2205/103; A61M 2205/3344
See application file for complete search history.

(56) References Cited

U.S. PATENT DOCUMENTS

| | | | | |
|---|---|---|---|---|
| 4,108,173 | A * | 8/1978 | Slivenko | A61M 39/0247 604/175 |
| 4,417,888 | A * | 11/1983 | Cosentino | A61M 39/0247 604/29 |
| 4,421,507 | A * | 12/1983 | Bokros | A61M 39/0247 604/539 |
| 4,776,843 | A * | 10/1988 | Martinez | A61M 39/0247 604/86 |
| 4,804,369 | A * | 2/1989 | Lapeyre | A61M 39/0247 604/891.1 |
| 2001/0049488 | A1* | 12/2001 | Kawamura | A61M 39/0247 604/29 |
| 2006/0111694 | A1* | 5/2006 | Fukai | A61M 39/045 604/905 |
| 2006/0217588 | A1* | 9/2006 | Gross | A61M 60/268 600/16 |
| 2006/0224101 | A1* | 10/2006 | Glenn | A61M 27/006 604/8 |
| 2006/0229548 | A1* | 10/2006 | Cull | A61M 39/22 604/7 |
| 2006/0270966 | A1* | 11/2006 | Bolling | A61M 1/3659 604/9 |
| 2007/0299384 | A1* | 12/2007 | Faul | A61M 1/3655 604/8 |
| 2008/0228132 | A1* | 9/2008 | Langenbach | A61M 39/0208 604/30 |
| 2011/0034852 | A1* | 2/2011 | Hausler | A61M 1/3655 604/6.16 |
| 2013/0150774 | A1* | 6/2013 | Field | A61M 1/742 604/9 |

FOREIGN PATENT DOCUMENTS

| | | |
|---|---|---|
| CN | 101601886 A | 12/2009 |
| CN | 102488536 A | 6/2012 |
| CN | 103212154 A | 7/2013 |
| EP | 0638328 A1 | 2/1995 |

OTHER PUBLICATIONS

Convertino, V. A., Howard, J. T., Hinojosa-Laborde, C., Cardin, S., Batchelder, P., Mulligan, J., . . . & MacLeod, D. B. (2015). Individual-specific, beat-to-beat trending of significant human blood loss: the compensatory reserve. Shock, 44, 27-32. (Year: 2015).*
Convertino, V.A., Koons, N.J. and Suresh, M.R. (2021). Physiology of Human Hemorrhage and Compensation. In Comprehensive Physiology, Y.S. Prakash (Ed.). https://doi.org/10.1002/cphy.c200016 (Year: 2021).*
Thomas, Duncan P. "The demise of bloodletting." Journal of the Royal College of Physicians of Edinburgh 44.1 (2014): 72-77.*
DePalma, Ralph G., Virginia W. Hayes, and Leo R. Zacharski. "Bloodletting: past and present." Journal of the American College of Surgeons 205.1 (2007): 132-144.*
Luque-Ramirez, Manuel, et al. "Bloodletting has no effect on the blood pressure abnormalities of hyperandrogenic women taking oral contraceptives in a randomized clinical trial." Scientific Reports 11.1 (2021): 22097.*
Kwon, Chan-Young, Boram Lee, and Ju Ah Lee. "Efficacy and safety of bloodletting on ear apex for primary hypertension: a systematic review and meta-analysis." European Journal of Integrative Medicine 23 (2018): 90-100.*
Fernández-Real, José Manuel, et al. "Blood letting in high-ferritin type 2 diabetes: effects on insulin sensitivity and β-cell function." Diabetes 51.4 (2002): 1000-1004.*
Houschyar, K., et al. "Phlebotomy (bloodletting) in patients with metabolic syndrome: A randomized controlled trial." European journal of integrative medicine 1.4 (2009): 187-188.*

* cited by examiner

PRESSURE CONTROL VALVE FOR BLOOD SYSTEM AND ITS PRESSURE REGULATION METHOD

CROSS-REFERENCE TO RELATED APPLICATIONS

This application claims the benefit of priority from Chinese Patent Application No. 202311772487.0, filed on Dec. 21, 2023. The content of the aforementioned application, including any intervening amendments thereto, is incorporated herein by reference in its entirety.

TECHNICAL FIELD

This application relates to valves, and more particularly to a pressure control valve for blood system and its pressure regulation method.

BACKGROUND

Hypertension is a chronic disease, for which there is no permanent cure. At present, a common clinical therapy is to control a blood pressure within a normal range by long-term use of antihypertensive drugs, thereby effectively preventing hypertension paroxysm. Therefore, the diagnosis and treatment of the hypertension involves long-term drug therapy.

Drug therapy is a current mainstream method to lower the blood pressure, but it requires a period of time for the drug to exert its activity in vivo, during which the patient's life may suffer from serious threat in the case of emergency. In brief, the drug-based blood pressure lowering process is illustrated as follows:

blood pressure rise→perception→drug administration-→blood pressure reduction.

After the blood pressure rises, delayed perception, delayed drug administration and delayed efficacy will delay the blood pressure lowering, for example, an antihypertensive drug, such as nitroglycerin and sodium nitroprusside, usually requires 15-30 min (even longer considering the delayed perception and delayed drug administration) to exert its effect after oral administration. If the above delays can be eliminated, that is, the blood pressure can be immediately lowered by some methods, countless lives could be saved.

Compared with the drug therapy through biological pathways, the physical methods have a faster response in lowering the blood pressure. Based on the principle that the blood pressure can be lowered by reducing the blood volume in the case of constant vessel volume, a bloodletting therapy has been developed for lowering the blood pressure, but this therapy is almost only used in the case of emergency in operating rooms. Moreover, the relevant devices are relatively complex, which makes the physical therapy not suitable for the routine blood pressure reduction. Therefore, it has been rarely reported about the application of physical therapy in the routine control of the blood pressure rise, and it is urgent to develop a device for lowering blood pressure based on the physical therapy.

SUMMARY

In view of defects in the prior art, this application provides a pressure control valve for blood system and its pressure regulation method. Through the cooperation of a valve core, a wave spring and a motor, the valve can adjust the opening pressure by compressing the wave spring. The valve core can move between a value body and a valve cover, so that a liquid in the valve body can be discharged to the outside through the valve core, maintaining a liquid pressure in the valve body always in a stable state. The pressure control valve can physically lower the blood pressure with high simple operation, rapid response and excellent safety, and is suitable for multiple application scenarios.

In order to achieve the above objects, the following technical solutions are adopted herein.

This application provides a pressure control valve for blood system, comprising:
a valve body;
a valve cover;
a valve core;
a sealing device; and
a driving device;
wherein the valve cover is connected with a side wall of the valve body; and the valve core, the sealing device and the driving device are arranged at a connection between the valve cover and the valve body;
the valve body has a hollow column structure; a through hole is provided on the side wall of the valve body; two ends of the through hole are respectively provided with a first groove with a threaded structure; and the first groove is provided on the side wall of the valve body;
a lower surface of the valve cover is connected with the side wall of valve body; an upper surface of the valve cover is provided with a threaded hole configured for a bolt to pass through; the bolt is configured to pass through the threaded hole to be connected to the first groove; the upper surface of the valve cover has a first space for mounting the driving device; a cover plate is provided above the first space; and two sides of the cover plate are respectively connected to the valve cover through a cylindrical pin;
a liquid-drainage channel is arranged at the connection between the valve cover and the valve body;
the driving device comprises a motor, a power supply, a rotary shaft, a wave spring and a sliding block; the power supply, the motor, the rotary shaft, the sliding block, the wave spring and the valve core are sequentially arranged below the cover plate; an output end of the power supply is connected to an input end of the motor; an output end of the motor is connected to a first end of the rotary shaft; a second end of the rotary shaft is fixedly connected to a first end of the sliding block; a first end of the wave spring is in contact with a second end of the sliding block; and a second end of the wave spring is in contact with a first end of the valve core;
the first end of the valve core is provided with a second space configured for the wave spring to work; an outer side wall at a middle of the valve core is provided with an extension structure; the extension structure is configured to prevent the valve core from sliding into an interior of the valve body; a second end of the valve core is a hollow structure, and a side wall of the second end of the valve core is provided with a plurality of second grooves for liquid flow.

In some embodiments, the side wall of the valve body is further provided with a sensor; the sensor is communicated in communication with a central controller through a wireless device; and the central controller is configured to remotely control the motor to rotate through the wireless device.

In some embodiments, in a case that a pressure of a liquid in the valve body is within a normal range, the extension structure is configured to be fittedly inserted into the through hole on the valve body, the wave spring is in a compressed state, and the liquid-drainage channel is not communicated with the interior of the valve body; in a case that the pressure of the liquid in the valve body is higher than the normal range, the valve core is configured to be pushed by the liquid to further squeeze the wave spring, so as to separate the extension structure from the through hole, and to allow the liquid to flow through the valve core and the liquid-drainage channel to be discharged.

In some embodiments, the sealing device is a sealing ring.

This application further provides a pressure regulation method of the above pressure control valve, comprising:

(S1) injecting a liquid into the interior of the valve body; detecting a pressure of the liquid in the valve body by the sensor, and recording the pressure as an initial pressure; subjecting the middle of the valve core to be in close contact with the through hole on the valve body; and keeping the wave spring in a pre-compressed state;

(S2) when the pressure of the liquid in the valve body rises, driving the valve core to move up to compress the wave spring to discharge the liquid through the liquid-drainage channel; and (S3) when the pressure of the liquid in the valve body returns to a normal state, controlling, by the central controller, the motor to rotate to drive the rotary shaft to push the wave spring and the valve core, so that the extension structure is in close contact with the through hole again to return to an initial state;

wherein in step (S3), the number of revolutions of the motor is N, which is calculated as:

$$N = \frac{\Delta L}{P} = \frac{H-L}{P} + \frac{p_0 \pi d^2}{4KP};$$

wherein $\Delta L$ represents a length that the wave spring needs to be compressed for reaching a desired pre-tightening force; $h_0$ represents a height of the second space for mounting the wave spring; P represents a pitch of a thread for adjusting an opening pressure of the valve core; H represents a height of the wave spring at this moment; $p_0$ represents a value of the opening pressure of the valve core; d represents a diameter of the valve core; and K represents a stiffness of the wave spring; an operation time of the motor is t, and is expressed as:

$$t = \frac{N}{n} = \frac{H-L}{Pn} + \frac{p_0 \pi d^2}{4KPn};$$

wherein n represents a rotation speed of the motor.

In some embodiments, in step (S2), an amount of the liquid discharged from the liquid-drainage channel is $\Delta V$, expressed as:

$$\Delta V = V_{0(p_0+\Delta p)} - V_{0(p_0)} =$$
$$\left(1 + \frac{p_0 + \Delta p}{k}\right)\left[1 + \frac{E\pi d(p_0+\Delta p)}{4t}\right]^2 \frac{L\pi d^2}{4} - \left(1 + \frac{p_0}{k}\right)\left(1 + \frac{E\pi d p_0}{4t}\right)^2 \frac{L\pi d^2}{4};$$

wherein L represents an equivalent total length of a blood vessel; t represents an average thickness of the liquid-drainage channel; d represents an average diameter of the liquid-drainage channel; E represents an average elasticity modulus of the liquid-drainage channel; k represents a bulk modulus of the liquid; $\Delta p$ represents a difference value between a blood pressure and the opening pressure when the blood pressure exceeds the opening pressure; $V_0$ represents a volume of blood in the blood vessel at atmospheric pressure; and $p_0$ represents the opening pressure of the valve core.

Compared to the prior art, this application has the following beneficial effects.

(1) Through the cooperation among the valve body, the valve cover, the valve core, the sealing device and the driving device, the valve core can move up and down between the valve body and the valve cover by squeezing or releasing the wave spring, such that the valve can work as soon as symptoms of the hypertension occur, so as to quickly and safely lower the blood pressure.

(2) This application can accurately determine the movement time of the valve core through the pressure regulation method, so as to accurately adjust the blood pressure value. In addition, the pressure control valve of the present disclosure can be remotely controlled, and customize the treatment scheme for different users or different stages of a user to accurately satisfy needs of lowering blood pressure at different stages.

(3) Through the cooperation of the valve body, the valve cover, the valve core, the sealing device and the driving device, this application can completely eliminate the drug resistance which may occur during the drug therapy, and can effectively and safely lower the blood pressure for a long time.

In the Figures: 1, valve body; 2, blood pressure sensor; 3, first circular sealing ring; 4, second circular sealing ring; 5, C-shaped sealing ring; 6, valve cover; 7, bolt; 8, rectangular sealing ring; 9, cylindrical pin; 10, cover plate; 11, motor; 12, rotary shaft; 13, sliding block; 14, wave spring; 15, valve core; 16, second groove; 17, extension structure; 18, second space; 19, first groove; 20, through hole; and 21, liquid-drainage channel.

DETAILED DESCRIPTION OF EMBODIMENTS

Exemplary embodiments, features and aspects of the present disclosure will be described in detail below with reference to the accompanying drawings. Identical labels in the accompanying drawings indicate components with the same or similar functions. Although various aspects of embodiments are shown in the accompanying drawings, unless otherwise specified, it is not necessary to draw the accompanying drawings to scale.

The technical solutions of the present disclosure will be clearly and completely described below. It is obvious that described herein are only some embodiments of the present disclosure, rather than all embodiments.

This application provides a pressure control valve for blood system, which can be directly implanted in a vessel in the human body through a method by which other medical surgical devices are implanted in vivo.

Referring to FIGS. 1-4, a pressure control valve for blood system includes a valve body 1, a valve cover 6, a valve core 15, a sealing device, and a driving device. The valve cover 6 is connected with a side wall of the valve body 1. The valve core 15, the sealing device and the driving device are arranged at a connection between the valve cover 6 and the valve body 1.

Figure 1:
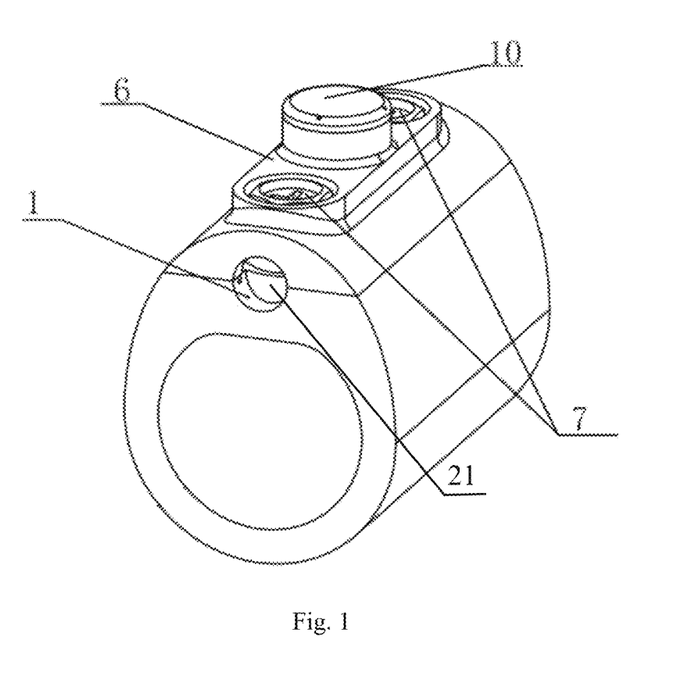
FIG. 1 schematically shows a structure of a pressure control valve for blood system according to an embodiment of the present disclosure.
Figure 2:
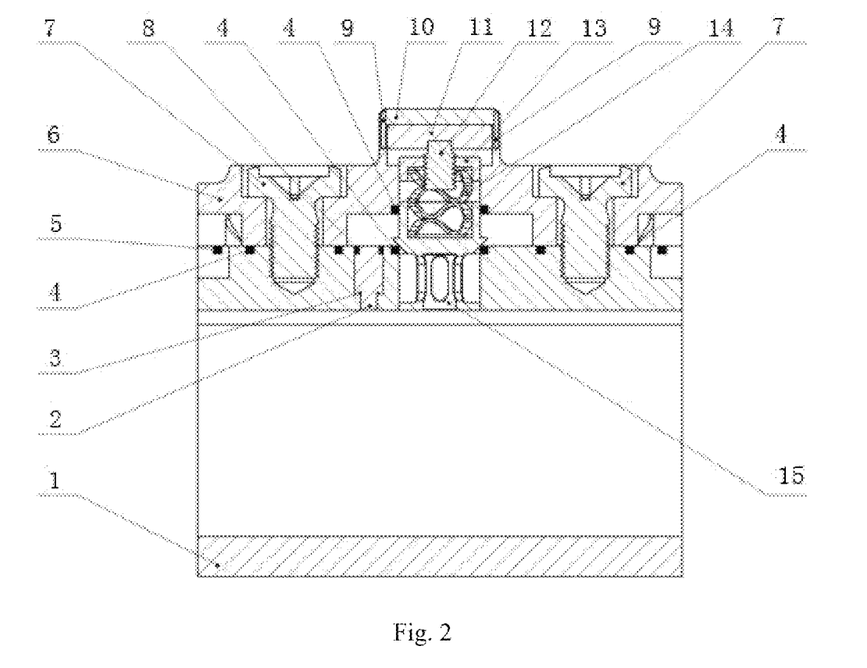
FIG. 2 is a sectional view of the pressure control valve according to an embodiment of the present disclosure.
Figure 3:
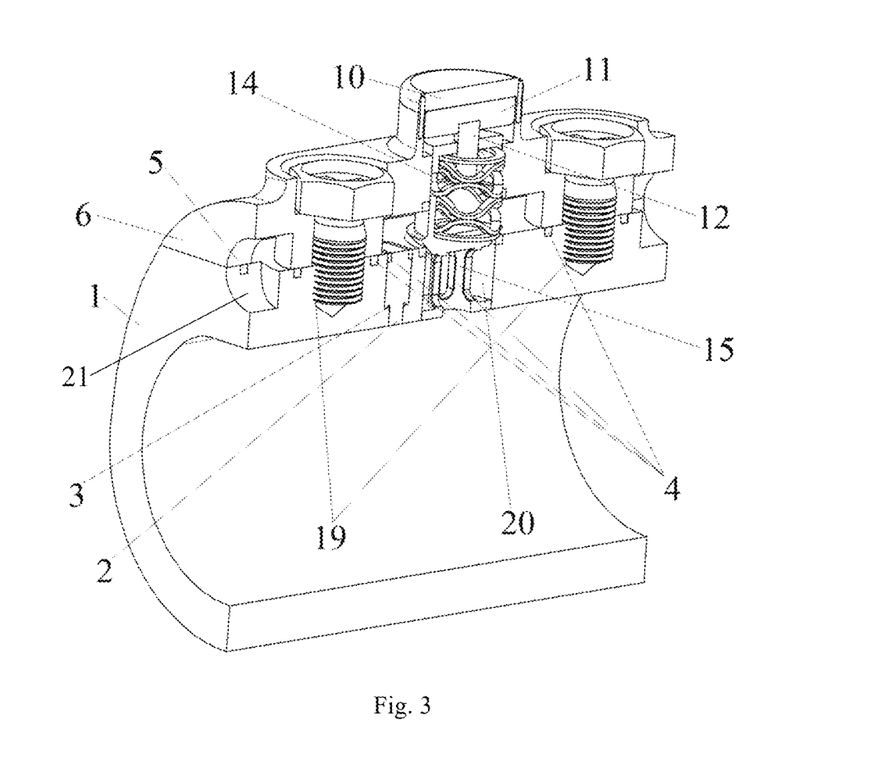
FIG. 3 is a sectional axonometric view of the pressure control valve according to an embodiment of the present disclosure.

The valve body 1 has a hollow column structure, and a through hole 20 is provided on the side wall of the valve body 1. Two ends of the through hole 20 are respectively provided with a first groove 19 with a threaded structure, and the first groove 19 is provided on the side wall of the valve body.

A lower surface of the valve cover 6 is connected with the side wall of valve body 1. An upper surface of the valve cover 6 is provided with a threaded hole configured for a bolt to pass through. The bolt is configured to pass through the threaded hole and connected to the first groove 19. The upper surface of the valve cover 6 has a first space for mounting the driving device. A cover plate is provided above the first space. Two sides of the cover plate are respectively connected to the valve cover 6 through a cylindrical pin.

A liquid-drainage channel 21 is arranged at the connection between the valve cover 6 and the valve body 1. The liquid-drainage channel 21 is configured to discharge excess liquid (i.e., blood) in the valve body 1 in a high-pressure state to lower the liquid pressure.

The driving device includes a motor 11, a power supply, a rotary shaft 12, a wave spring 14 and a sliding block 13. The power supply, the motor 11, the rotary shaft 12, the sliding block 13, the wave spring 14 and the valve core 15 are sequentially arranged below the cover plate. An output end of the power supply is connected to an input end of the motor 11. An output end of the motor 11 is connected to a first end of the rotary shaft 12. A second end of the rotary shaft 12 is fixedly connected to a first end of the sliding block 13. A first end of the wave spring 14 is in contact with a second end of the sliding block 13. A second end of the wave spring 14 is in contact with a first end of the valve core 15.

The power supply can be charged wirelessly, or directly reserved a charging port outside a human body, or replaced through surgery.

Figure 4:
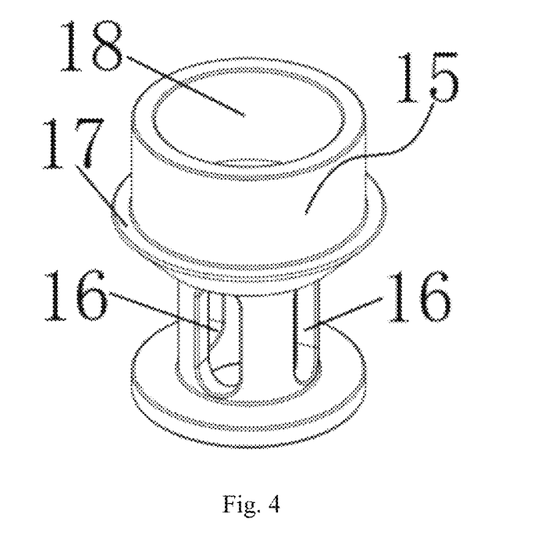
FIG. 4 schematically shows a structure of a valve core of the pressure control valve according to an embodiment of the present disclosure.

The first end of the valve core 15 is provided with a second space 18 configured for the wave spring 14 to work. An outer side wall at a middle of the valve core 15 is provided with an extension structure 17. The extension structure 17 is configured to prevent the valve core 15 from sliding into an interior of the valve body 1. A second end of the valve core 15 is a hollow structure, and a side wall of the second end of the valve core 15 is provided with a plurality of second grooves 16 for liquid flow.

The side wall of the valve body is further provided with a blood pressure sensor 2. The blood pressure sensor 2 is in communication with a central controller through a wireless device. The central controller is configured to remotely control the motor 11 to rotate through the wireless device.

In a case that a pressure of a liquid in the valve body 1 is within a normal range, the extension structure is configured to be fittedly inserted into the through hole 20 on the valve body 1, the wave spring 14 is in a stretched state, and the liquid-drainage channel 21 is not communicated with the interior of the valve body 1. In a case that the pressure of the liquid in the valve body 1 is higher than the normal range, the valve core 15 is configured to be pushed by the liquid to squeeze the wave spring 14, so as to separate the extension structure from the through hole 20, and to allow the liquid to flow through the valve core 15 and the liquid-drainage channel 21 to be discharged.

The sealing device is a sealing ring. The sealing ring is selected from a C-shaped sealing ring and a circular sealing ring according to practical needs.

A pressure regulation method of the above pressure control valve is also provided, including the following steps.

(1) A liquid is injected into the interior of the valve body 1. The blood pressure sensor detects a pressure of the liquid in the valve body and records it as an initial pressure. The middle of the valve core 15 is subjected to be in close contact with the through hole 20 on the valve body 1, and the wave spring 14 is kept in a pre-compressed state.

(S2) When the pressure of the liquid in the valve body 1 rises, the valve core 15 is driven to move up to compress the wave spring 14 to discharge the liquid through the liquid-drainage channel 21.

(S3) When the pressure of the liquid in the valve body 1 returns to a normal state, the central controller controls the motor 11 to rotate to drive the rotary shaft 12 to push the wave spring 14 and the valve core 15, so that the extension structure is in close contact with the through hole 20 again to return to an initial state.

It is necessary to confirm the number of revolutions of the motor 11 from the initial state (a state under which the second space has a maximum height) to a state with an opening pressure of the valve core of $p_0$ (a state under which the second space has a height of $h_0$). The number of revolutions of the motor 11 is N, and is expressed as:

$$N = \frac{\Delta L}{P} = \frac{H-L}{P} + \frac{p_0 \pi d^2}{4KP};$$

where $\Delta L$ represents a length that the wave spring needs to be compressed for reaching the desired pre-tightening force; $h_0$ represents a height of the second space 18 at this time; P represents a pitch of a thread for adjusting an opening pressure of the valve core; L represents an original length of the wave spring; H represents a height of the wave spring 14 at this moment; $p_0$ represents a value of the opening pressure of the valve core 15; d represents a diameter of the valve core 15; and K represents a stiffness of the wave spring 14.

An operation time of the motor is t, and is expressed as:

$$t = \frac{N}{n} = \frac{H-L}{Pn} + \frac{p_0 \pi d^2}{4KPn};$$

where n represents a rotation speed of the motor.

In step (S2), an amount of the liquid discharged from the liquid-drainage channel 21 is $\Delta V$, expressed as:

$$\Delta V = V_{0(p_0 + \Delta p)} - V_{0(p_0)} =$$

-continued
$$\left(1+\frac{p_0+\Delta p}{k}\right)\left[1+\frac{E\pi d(p_0+\Delta p)}{4f}\right]^2\frac{L\pi d^2}{4}-\left(1+\frac{p_0}{k}\right)\left(1+\frac{E\pi dp_0}{4t}\right)^2\frac{L\pi d^2}{4};$$

where L represents an equivalent total length of a blood vessel; t represents an average thickness of the liquid-drainage channel 21; d represents an average diameter of the liquid-drainage channel 21; E represents an average elasticity modulus of the liquid-drainage channel 21; k represents a bulk modulus of the liquid; Δp represents a difference value between a blood pressure and the opening pressure of the valve core 15 when the blood pressure exceeds the opening pressure; $V_0$ represents a volume of blood in the vessel at atmospheric pressure; and $p_0$ represents the opening pressure of the valve core 15.

EMBODIMENT

The pressure control valve for blood system of the present disclosure is implanted in a human blood circulation system. That is, a vessel is cut off somewhere to form a first vessel end and a second vessel end. The first vessel end is connected to an inlet of the valve body 1, and the second vessel end is connected to an outlet of the valve body 1. Blood in the vessel flows into the pressure control valve through the inlet of the valve body 1, and flows out of the pressure control valve through the outlet of the valve body 1.

The blood in the valve body 1 will fill a first cavity form by the valve body 1, a second circular sealing ring 4, the blood pressure sensor 2, a first circular sealing ring 3 and the valve core 15. Because the blood in the valve body 1 has a pressure, a lower end of the valve core 15 is applied with a first force.

At an upper end of the valve core 15, through rotation of the motor 11 and cooperation of a screw pair formed by the rotary shaft 12 and the sliding block 13, a distance between a lower end of the sliding block 13 and the upper end of the valve core 15 can be adjusted. Because the wave spring 14 is arranged between the rotary shaft 12 and the valve core 15, the wave spring 14 can be compressed or released through rotation of the motor 11, so as to adjust a pre-tightening force of the wave spring 14.

Owing to the pre-tightening force of the wave spring 14, the upper end of the valve core 15 is applied with a second force. In summary, the valve core 15 is kept balance under the action of the first force applied on the upper end of the valve core 15, the second force applied on the lower end of the valve core 15 and a support force of the second circular sealing ring 4

When the pressure of the blood is not large enough, the second force applied on the lower end of the valve core 15 is not large enough to overcome the first force applied on the upper end of the valve core 15 to open a sealing of the valve core 15 and the second circular sealing ring 4.

When the pressure of the blood is large enough, the second force applied on the lower end of the valve core 15 is large enough to overcome the first force applied on the upper end of the valve core 15 to open the sealing of the valve core 15 and the second circular sealing ring 4. In this way, the blood enters the valve body 1, the valve cover 6, and a second cavity formed by the second circular sealing ring 4, the C-shaped sealing ring 5, the blood pressure sensor 2 and a rectangular sealing ring 8. At this moment, owing to decreasing of an amount of the blood in the blood system and constant volume of the blood system, the blood pressure is lowered. When the blood pressure is lowered to a specific value, the second force applied on the lower end of the valve core 15 cannot overcome the first force applied on the upper end of the valve core 15 to open the sealing of the valve core 15 and the second circular sealing ring 4, thereby stopping overflow of the blood. The blood overflowed in the valve body 1, the valve cover 6 and the second cavity can be discharged through a blood outlet formed by the valve cover 6 and the valve body 1.

The blood pressure sensor 2 is configured to measure a blood pressure at a corresponding position through a device at its lower end, and transmit the blood pressure at the corresponding position to a corresponding device.

A blood output is roughly calculated by the following method.

Figure 5A:
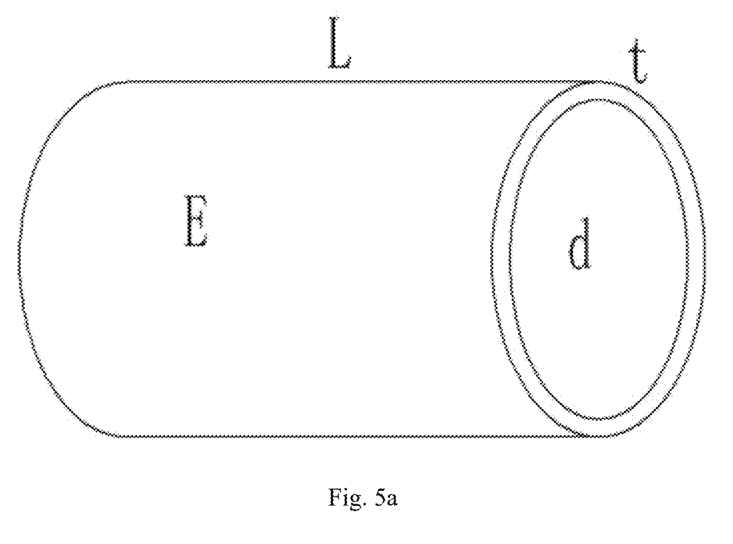
FIGS. 5a-b schematically show a blood vessel in Embodiment 1 of the present disclosure.
Figure 5B:
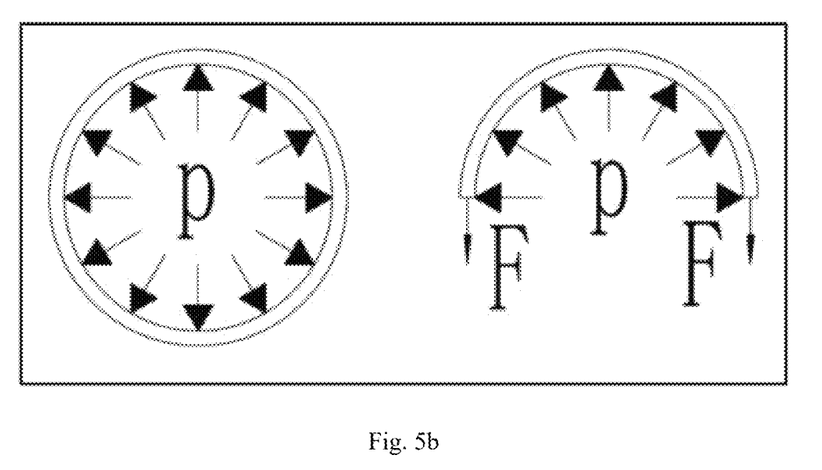

FIG. 5*a* is a vessel model, and FIG. 5*b* shows a force state of a vessel wall; where L represents a total length of blood vessels in the human body; t represents an average thickness of the vessel; d represents an average diameter of the vessel; and E represents an average elasticity modulus of the vessel (assuming that deformation of vessel is within an elastic range and satisfies the Hooke's law). When the blood with a pressure of p flows in the vessel, the force state of the vessel wall is shown as FIG. 5*b*, and the resultant force F at the cross section of the vessel can be calculated based on the force balance in a vertical direction, expressed as:

$$2F=\int_0^\pi pL\frac{d}{2}d\theta.$$

It is assumed that normal stresses σ are uniformly distributed in a longitudinal section of the wall of the vessel, and the stress F can also be calculated as:

$$F=\sigma tL.$$

The normal stresses σ can obtained by simultaneous equations of two equations above, and are expressed as:

$$\sigma=\frac{\pi dp}{4t}.$$

A strain ε is expressed as:

$$\varepsilon=E\sigma=\frac{E\pi dp}{4t}.$$

A relation between a change of circumference of ΔC and an original circumference C in a cross section of the wall of the vessel is expressed as:

$$\Delta C=\varepsilon C=\varepsilon\pi d.$$

A circumference of an inner wall of the vessel $C_p$ at the blood pressure of p is expressed as:

$$C_p = C + \Delta C = \pi d + \varepsilon \pi d = (1 + \varepsilon)\pi d = \left(1 + \frac{E\pi dp}{4t}\right)\pi d.$$

A diameter of the inner wall of the vessel $d_p$ at the blood pressure of p is expressed as:

$$d_p = \frac{C_p}{\pi} = \frac{\left(1 + \frac{E\pi dp}{4t}\right)\pi d}{\pi} = \left(1 + \frac{E\pi dp}{4t}\right)d.$$

A flow area of the blood pressure of the vessel $S_p$ at the blood pressure of p is expressed as:

$$S_p = \frac{\pi d_p^2}{4} = \left(1 + \frac{E\pi dp}{4t}\right)^2 \frac{\pi d^2}{4}.$$

A volume of the vessel $V_p$ at the blood pressure of p is expressed as:

$$V_p = LS_p = \left(1 + \frac{E\pi dp}{4t}\right)^2 \frac{L\pi d^2}{4}.$$

It is assumed that a bulk modulus of the blood is k. A relation between a volume of the blood in the vessel $V_0$ with the blood pressure of p when placed at an atmospheric pressure and the volume of the vessel $V_p$:

$$k = -\frac{0 - p}{\frac{v_0 - v_p}{v_p}}; \text{ and}$$

$$V_0 = \left(1 + \frac{p}{k}\right)\left(1 + \frac{E\pi dp}{4t}\right)^2 \frac{L\pi d^2}{4}.$$

It is assumed that an opening pressure set by a patient is $p_0$. When the blood pressure increases by $\Delta p$ on the basis of $p_0$, a blood volume that should be discharged by the pressure control valve is expressed as:

$$\Delta V = V_{0(p_0+\Delta p)} - V_{0(p_0)} =$$
$$\left(1 + \frac{p_0 + \Delta p}{k}\right)\left[1 + \frac{E\pi d(p_0 + \Delta p)}{4t}\right]^2 \frac{L\pi d^2}{4} - \left(1 + \frac{p_0}{k}\right)\left(1 + \frac{E\pi d p_0}{4t}\right)^2 \frac{L\pi d^2}{4}.$$

The number of revolutions of the motor 11 and a working time of the motor 11 are as follows: it is assumed that an opening pressure of the human-blood safety valve is $p_0$; a stiffness of the wave spring is K; an original length of the wave spring is L; the diameter of the valve core 15 is d; a pitch of a thread configured to adjust an opening pressure is P; a maximum height of the second space 18 is H, and a minimum height of the second space 18 is h; where L>H>h, and the wave spring works within an elastic range.

When the opening pressure of the human-blood safety valve is at a minimum value of $p_{0\ min}$, and the height of the second space 18 is H, at this time, the $p_{0\ min}$ is calculated according to a force balance of the valve core 15 as follows:

$$p_{0min} \frac{\pi d^2}{4} = (L - H)K; \text{ and}$$

$$p_{0min} = \frac{4(L - H)K}{\pi d^2}.$$

When the opening pressure of the human-blood safety valve is at a maximum value of $p_{0\ max}$, and the height of the second space 18 is h, at this time, the $p_{0\ max}$ is calculated according to the force balance of the valve core 15 as follows:

$$P_{0max} \frac{\pi d^2}{4} = (L - h)K; \text{ and}$$

$$P_{0max} = \frac{4(L - h)K}{\pi d^2}.$$

In summary, the opening pressure of $p_0$ is within a range of:

$$\frac{4(L - H)K}{\pi d^2} \le p_0 \le \frac{4(L - h)K}{\pi d^2}.$$

L, K, H, h and d herein are inherent parameters, if a basic structure of the pressure control valve has been determined (H, h and d have been determined), the range of the opening pressure of $p_0$ can be adjusted through adjusting wave spring parameters of L and K. With target values of $p_{0\ min}$ and $p_{0\ max}$ as known values, L and K are determined as:

$$\begin{cases} p_{0min} = \frac{4(L - H)K}{\pi d^2} \\ p_{0max} = \frac{4(L - h)K}{\pi d^2} \end{cases}.$$

Because H, h and d have been determined, and $p_{0\ min}$ and $p_{0\ max}$ are known values, L and K are obtained as:

$$\begin{cases} K = \frac{\pi d^2 (p_{0max} - p_{0min})}{4(H - h)} \\ L = \frac{p_{0max}H - p_{0min}h}{p_{0max} - p_{0min}} \end{cases}.$$

When the opening pressure is $p_0$, according to the force balance of the valve core 15, the height of the second space 18 is $h_0$, and is calculated as:

$$p_0 \frac{\pi d^2}{4} = (L - h_0)K; \text{ and}$$

$$h_0 = L - \frac{p_0 \pi d^2}{4K}.$$

A length of the wave spring that needs to be compressed for reaching the desired pre-tightening force is $\Delta L$, and is calculated as:

$$\Delta L = H - h_0 = H - L + \frac{p_0 \pi d^2}{4K}.$$

The number of revolutions of the motor 11 is N, and is expressed as:

$$N = \frac{\Delta L}{P} = \frac{H-L}{P} + \frac{p_0 \pi d^2}{4KP}.$$

If the rotation speed of the motor 11 of n is known, the rotation time of the motor 11 is t, and is expressed as:

$$t = \frac{N}{n} = \frac{H-L}{Pn} + \frac{p_0 \pi d^2}{4KPn}.$$

In the formulas of N and t above, H, d, P, L and K are inherent parameters, and $p_0$, as a target value, is a known value, therefore, N and t can be determined.

Described above are only preferred embodiments of the present disclosure, which are not intended to limit the scope of the present disclosure. Various variations, replacements and improvements made by those of ordinary skill in the art without departing from the spirit of the present disclosure shall fall within the scope of the disclosure defined by the appended claims.

What is claimed is:

1. A pressure control valve, comprising:
   a valve body;
   a valve cover;
   a valve core;
   a sealing device; and
   a driving device;
   wherein the valve cover is connected with a side wall of the valve body; and the valve core, the sealing device and the driving device are arranged at a connection between the valve cover and the valve body;
   the valve body has a hollow column structure; a through hole is provided on the side wall of the valve body; two ends of the through hole are respectively provided with a first groove with a threaded structure; and the first groove is provided on the side wall of the valve body;
   a lower surface of the valve cover is connected with the side wall of valve body; an upper surface of the valve cover is provided with a threaded hole configured for a bolt to pass through; the bolt is configured to pass through the threaded hole to be connected to the first groove; the upper surface of the valve cover has a first space for mounting the driving device; a cover plate is provided above the first space; and two sides of the cover plate are respectively connected to the valve cover through a cylindrical pin;
   a liquid-drainage channel is arranged at the connection between the valve cover and the valve body;
   the driving device comprises a motor, a power supply, a rotary shaft, a wave spring and a sliding block; the power supply, the motor, the rotary shaft, the sliding block, the wave spring and the valve core are sequentially arranged below the cover plate; an output end of the power supply is connected to an input end of the motor; an output end of the motor is connected to a first end of the rotary shaft; a second end of the rotary shaft is fixedly connected to a first end of the sliding block; a first end of the wave spring is in contact with a second end of the sliding block; and a second end of the wave spring is in contact with a first end of the valve core; and
   the first end of the valve core is provided with a second space configured to hold the wave spring; an outer side wall at a middle of the valve core is provided with an extension structure; the extension structure is configured to prevent the valve core from sliding into an interior of the valve body; and a second end of the valve core is a hollow structure, and a side wall of the second end of the valve core is provided with a plurality of second grooves for liquid flow.

2. The pressure control valve of claim 1, wherein the side wall of the valve body is further provided with a sensor; the sensor is in communication with a central controller through a wireless device; and the central controller is configured to remotely control the motor to rotate through the wireless device.

3. The pressure control valve of claim 2, wherein if a pressure of a liquid in the valve body is within a normal range, the extension structure is configured to be fittedly inserted into the through hole on the valve body, the wave spring is in a compressed state, and the liquid-drainage channel is not communicated with the interior of the valve body; and
   wherein if the pressure of the liquid in the valve body is higher than the normal range, the valve core is configured to be pushed by the liquid to squeeze the wave spring, so as to separate the extension structure from the through hole, and to allow the liquid to flow through the valve core and the liquid-drainage channel to be discharged.

4. The pressure control valve of claim 1, wherein the sealing device is a sealing ring.

* * * * *